(12) United States Patent
Wang

(10) Patent No.: US 12,272,140 B2
(45) Date of Patent: Apr. 8, 2025

(54) METHOD FOR DETECTING OBJECTS AND THEIR STATE, APPARATUS AND STORAGE MEDIUM APPLYING METHOD, AND ELECTRONIC DEVICE

(71) Applicant: HON HAI PRECISION INDUSTRY CO., LTD., New Taipei (TW)

(72) Inventor: Yi-Chen Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 500 days.

(21) Appl. No.: 17/554,497

(22) Filed: Dec. 17, 2021

(65) Prior Publication Data

US 2022/0207877 A1 Jun. 30, 2022

(30) Foreign Application Priority Data

Dec. 25, 2020 (CN) .......................... 202011566690.9

(51) Int. Cl.
*G06V 20/50* (2022.01)
*G06T 7/70* (2017.01)
*G06V 10/50* (2022.01)
*G06V 10/774* (2022.01)

(52) U.S. Cl.
CPC .............. *G06V 20/50* (2022.01); *G06T 7/70* (2017.01); *G06V 10/50* (2022.01); *G06V 10/774* (2022.01); *G06T 2207/20021* (2013.01); *G06T 2207/20081* (2013.01); *G06T 2207/30148* (2013.01)

(58) Field of Classification Search
CPC ...... G06V 20/50; G06V 10/50; G06V 10/774; G06V 10/457; G06V 2201/06; G06T 7/70; G06T 2207/20021; G06T 2207/20081; G06T 2207/30148; G06T 2207/20084; G06T 7/0004; G06T 7/73; G06T 2207/10004; G06T 2207/30242
See application file for complete search history.

(56) References Cited

U.S. PATENT DOCUMENTS

| | | | |
|---|---|---|---|
| 10,122,973 B2 | 11/2018 | Zhao et al. | |
| 10,867,824 B2 | 12/2020 | Wu et al. | |
| 11,276,194 B2 | 3/2022 | Tomochika et al. | |
| 2015/0243031 A1* | 8/2015 | Narasimha | G06V 10/774 382/103 |
| 2018/0040494 A1* | 2/2018 | Rebstock | H04N 23/90 |

(Continued)

FOREIGN PATENT DOCUMENTS

| | | |
|---|---|---|
| CN | 104751163 A | 7/2015 |
| CN | 111937034 A | 11/2020 |
| TW | 202004962 A | 1/2020 |

*Primary Examiner* — Molly Wilburn
(74) *Attorney, Agent, or Firm* — ScienBiziP, P.C.

(57) ABSTRACT

A method for detecting the presence and the correct or incorrect placement of target objects in a container or carrier divides the container space into areas where the states of placement of the target objects in the container can be recognized, to generate N number of sub-areas, N is a positive integer. An artificial intelligence model is obtained by training the same according to training images of objects, the training images being images of the N sub-areas. The images are input into the artificial intelligence model and the states of placement are determined. The disclosure also provides an electronic device and a non-transitory storage medium.

7 Claims, 10 Drawing Sheets

(56) References Cited

U.S. PATENT DOCUMENTS

2020/0311956 A1* 10/2020 Choi .................... G06V 10/454
2021/0012524 A1* 1/2021 Tomochika ............ G06V 10/82
2021/0304550 A1* 9/2021 Kelly ........................ G06T 7/10

* cited by examiner

_US 12,272,140 B2_

1

METHOD FOR DETECTING OBJECTS AND THEIR STATE, APPARATUS AND STORAGE MEDIUM APPLYING METHOD, AND ELECTRONIC DEVICE

FIELD

The subject matter herein generally relates to manufacturing processes.

BACKGROUND

In a packaging and testing plant, after a semiconductor wafer is placed on a wafer carrier and covered by a robotic arm or manually. The wafer inside the carrier must be inspected before being moved between different workstations or shipping to other manufacturers. The quantity and positions of the wafers inside the carrier should be the same as the barcode record on the wafer carrier, and the wafers should be intact and correctly stacked, not obliquely.

Currently, specific objects contained in a confined space are manually inspected. For example, when inspecting a wafer in a wafer carrier, the inspector recognizes the wafer inside the wafer carrier from six view points. The wafers should be stacked inside the carrier with a correct number and a correct location. Because wafers are densely placed in a wafer carrier, and the position and slanting of each wafer may not be obvious. Each wafer carrier has different placement combinations and different slant conditions, and the wafers having different shapes and can be identified from different view points. Some types of wafer carriers are not completely transparent and need to be inspected under illumination. Eye fatigue of the inspector can be problematic, and may lead to errors and misjudgments. When the circular carrier is being inspected from the six view points and the carrier may be rotated, the wafers may suffer collision damages during the rotation of the carrier.

Therefore, improvement is desired.

BRIEF DESCRIPTION OF THE DRAWINGS

Implementations of the present disclosure will now be described, by way of embodiments, with reference to the attached figures.

DETAILED DESCRIPTION

Figure 1:
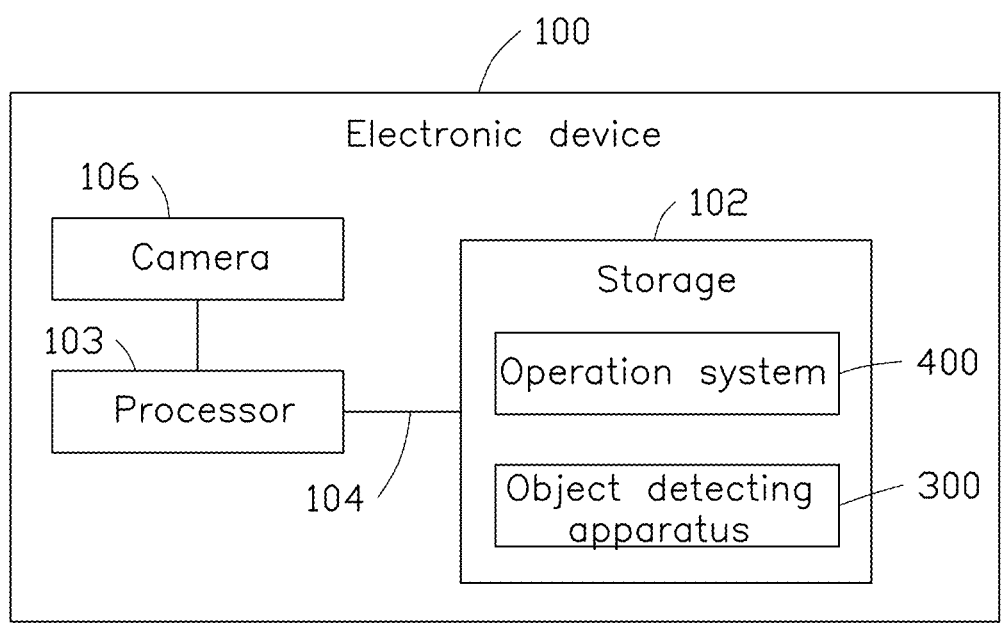
FIG. 1 is a schematic diagram of an embodiment of an electronic device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 2:
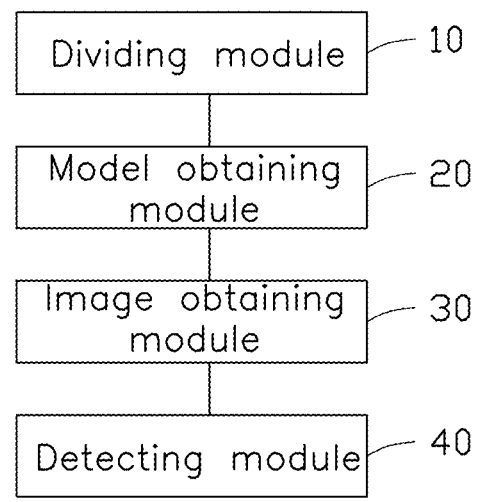
FIG. 2 is a schematic diagram of an embodiment of an object detecting apparatus.

FIGS. 1 and 2 illustrate an electronic device 100 and an object detecting apparatus 300 in accordance with an embodiment of the present disclosure.

The electronic device 100 captures images of target objects 201 received in a container 200, inputs the captured images into an artificial intelligence model, and determines the states of placement of target objects 201 in container 200. In at least one embodiment, the container 200 is a box for shipping semiconductor wafers. The container 200 can be made of transparent material or semi-transparent material. The target objects 201 are wafers.

In other embodiment, the electronic device 100 may also include more or fewer elements, or have different element configurations. The electronic device 100 may include a storage 102, a processor 103, a communication bus 104, and a camera 106.

The storage 102 stores program codes. The storage 102 can be an embedded circuit having a storing function, such as a memory card, a trans-flash (TF) card, a smart media card, a secure digital card, and a flash card, and so on. The storage 102 transmits and receives data to and from the processor 103 through the communication bus 104. The storage 102 stores an object detecting apparatus 300 and an operation system 400.

The operation system 400 manages and controls hardware and software programs. The operation system 400 further supports operations of the object detecting apparatus 300 and other software and programs.

The processor 103 can be a micro-processor or a digital processor. The processor 103 is used for running the program codes stored in the storage 102 to execute different functions. Modules in FIG. 2 are program codes stored in the storage 102 and are implemented by the processor 103 for executing a method for locating target objects 201 in the container 200. The processor 103 can be a central processing unit (CPU), or a large scale integrated circuit, being an operating core and a control core.

The communication bus 104 carries data of the storage 102 and the processor 103.

The camera 106 can capture images of the target objects 201 received in the container 200, to form training and detection images.

FIG. 2 illustrates the object detecting apparatus 300 in accordance with an embodiment of the present disclosure.

The object detecting apparatus 300 is used to detect the states of placement of the target objects 201 stored in the container 200.

The object detecting apparatus 300 includes a dividing module 10, a model obtaining module 20, an image obtaining module 30, and a detecting module 40.

The dividing module 10 is used to divide the area where the states of placements of the target objects 201 in the container 200 can be recognized, to generate N sub-areas, N being a positive integer.

In the embodiment, the dividing module 10 divides the area in which the placement states of the target objects 201 in the container 200 can be recognized, the division being into N sub-areas, so that even when the target objects 201 are densely placed in the container 200, there is a source of accurate image data.

In the embodiment, the area where the target object 201 can be identified in the container 200 can be understood to be able to accurately identify whether a target object 201 is in place, and the manner of its placement, as the target object 201 can be placed so as to be superimposed, or tilted, or subjected to damage.

Figure 3:
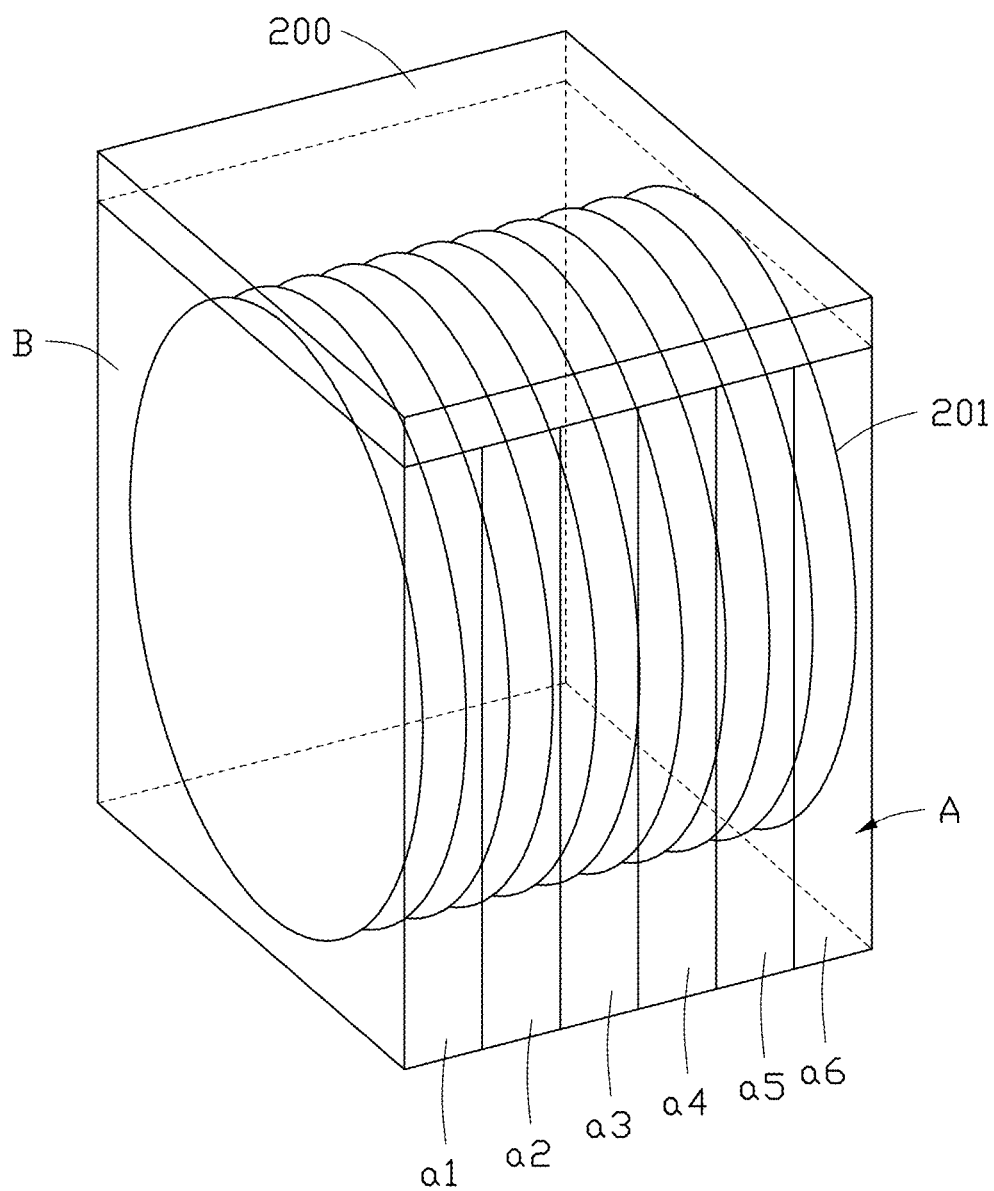
FIG. 3 is a schematic diagram of an embodiment of a container according to the present disclosure.

Referring to FIG. 3, taking the container 200 as a wafer carrier and the target object 201 as a wafer for example, Area A in FIG. 3 is an area where the placement state of the target object 201 in the container 200 can be recognized. When N is 6, each sub-area is a1 to a6. Area B in FIG. 3 cannot be used as an area where the placement state of the target object 201 in the container 200 can be identified, the placement state of the wafer in the wafer carrier cannot be observed through area B.

The model obtaining module 20 is used to obtain an artificial intelligence model, the artificial intelligence model is a model obtained by training according to a training images, wherein the training images is an image of the sub-area.

In the embodiment, the model obtaining module 20 can obtain training images of each sub-area in advance, and use the training images in computer vision or deep learning to obtain an artificial intelligence model.

The image obtaining module 30 is used to acquire the image of the sub-area.

In the embodiment, the image of the sub-area can be obtained through the camera 106.

The detecting module 40 is used to input the image into the artificial intelligence model, so as to obtain the placement state of the target object 201 in the sub-area.

In the embodiment, the image is input to the artificial intelligence model, and the artificial intelligence model performs image processing on the image, and outputs the result.

In the embodiment, the detecting module 40 determines the placement state of the target object 201 in the sub-area according to the detection result. For example, it is determined whether the target object 201 is placed in the position where the target object 201 is placed in the sub-area, and whether the target object 201 is placed abnormally. For example, if multiple target objects 201 are stacked on one position, the position of the target object 201 is inclined, or the target object 201 is damaged, it can also correspond to each position used to place the target object 201. The position of the target object 201 may be determined according to the position mark corresponding to each position where the target object 201 is placed, and the number of the target objects 201 to be placed may be determined according to the position mark.

Figure 4:
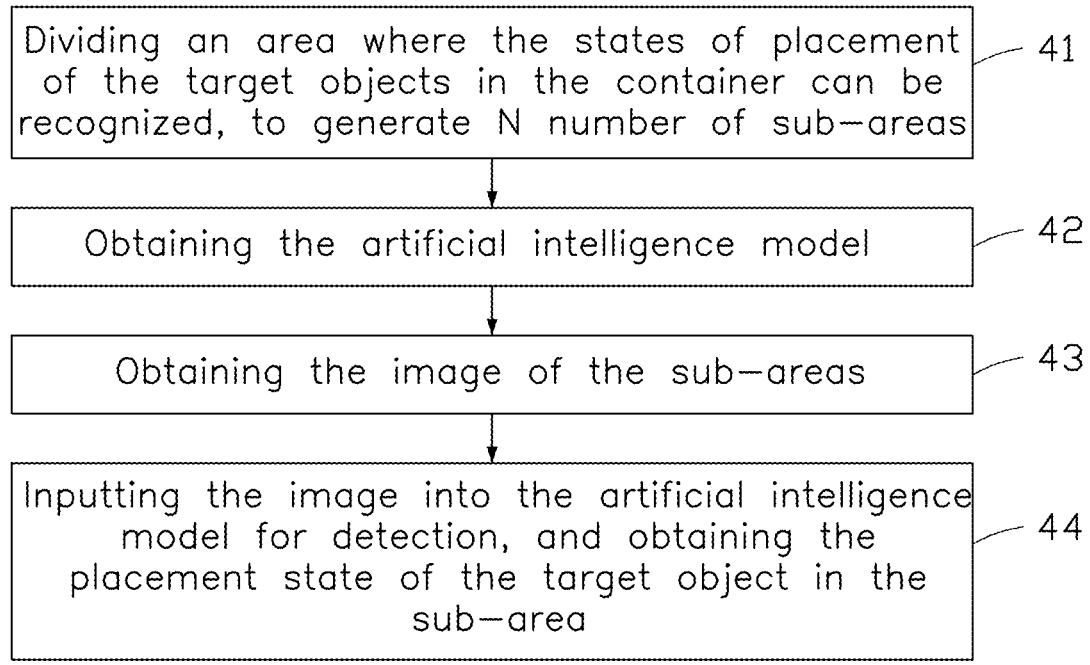
FIG. 4 is a flowchart of an embodiment of a method for detecting and recognizing objects according to the present disclosure.

FIG. 4 shows a flowchart of a method for the above. In at least one embodiment, a method for detecting target objects 201 in the container 200 is used in the object detecting apparatus 300. The method is used for capturing images of target objects 201 received in a container 200, inputting the captured images into an artificial intelligence model, and determining the states of placement of the target object 201 in the container 200 according to the output result of the artificial intelligence model status. In one embodiment, the container 200 is a box for shipping semiconductor wafers. The container 200 can be made of transparent material or semi-transparent material. The target objects 201 are wafers.

The method may comprise at least the following steps, which may be followed in a different order:

In block 41, dividing an area where the states of placement of the target object 201 in the container 200 can be recognized, to generate N number of sub-areas, N being a positive integer.

Figure 5:
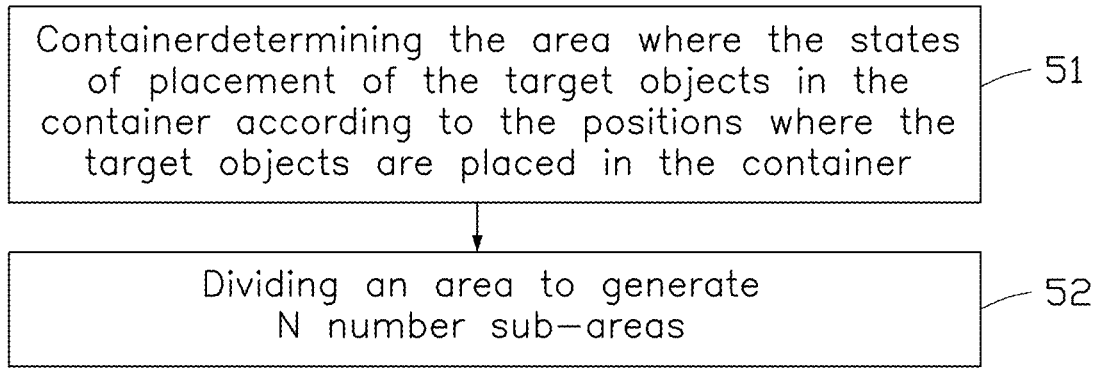
FIG. 5 is a flowchart of another embodiment of an object detecting method according to the present disclosure.

Referring to FIG. 5, the dividing the area where the states placement of the target object 201 in the container 200 can be recognized, to generate N sub-areas can be achieved by the following steps:

In block 51, determining the area where the states of placement of the target objects in the container according to the positions where the target objects are placed in the container.

In block 52, dividing an area to generate N number sub-areas.

In the embodiment, the sub-areas include the area where the target object is placed.

Area M is an area where the states of placement of the target object 201 in the container 200 can be recognized. The area M can identify the position O where the target object 201 is placed in the container 200. The wafer carrier has K positions O for placing the target object 201, and the area M is divided into L sub-areas.

Figure 6:
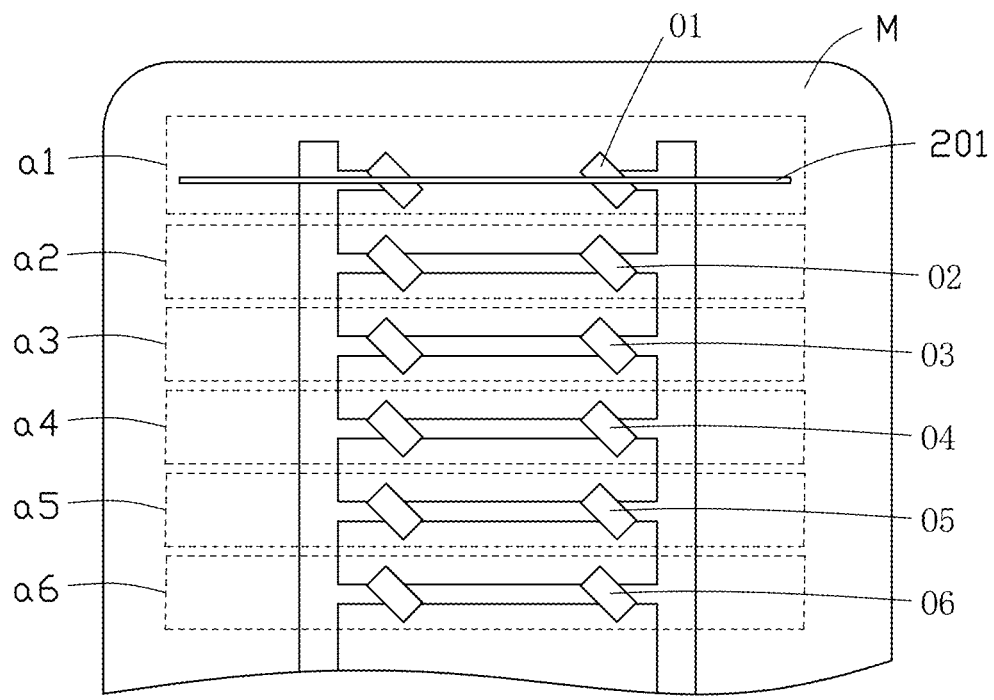
FIG. 6 is a schematic diagram of another embodiment of a container according to the present disclosure.

Referring to FIG. 6, take the container 200 as a wafer carrier, K=L=6 as an example. The position 01, 02, 03, 04, 05, and 06 where the target object 201 is placed in the container 200 can be identified through the area M in FIG. 6, and the area M is divided into 6 sub-areas, namely sub-areas a1 to a6.

When K and L are equal, there is a position O for placing the target object 201 in each subregion. In one embodiment, each sub-area may include multiple locations for placing the target object 201.

In block 42, obtaining the artificial intelligence model.

The artificial intelligence model is a model obtained by training according to a training images, wherein the training images is an image of the sub-area.

In the embodiment, the image of the target object 201 is placed in the sub-area, the image of the target object 201 is not placed, the target object 201 placed normal image, and the target object 201 placed abnormal image as the training images.

Take the wafer contained in the wafer carrier as an example for description. The image of each sub-area wafer placed in the wafer carrier is captured, the image of the wafer taken out of the wafer carrier, and the wafer is placed on the wafer carrier. The image of the stack in the carrier, the image of the diagonal wafer in the wafer carrier, the image of the damaged wafer placed on the wafer carrier, and the captured image is used as the training images for training.

The method can use computer vision or deep learning technology for training to obtain artificial intelligence models.

In block 43, obtaining the images of the sub-areas.

Figure 7:
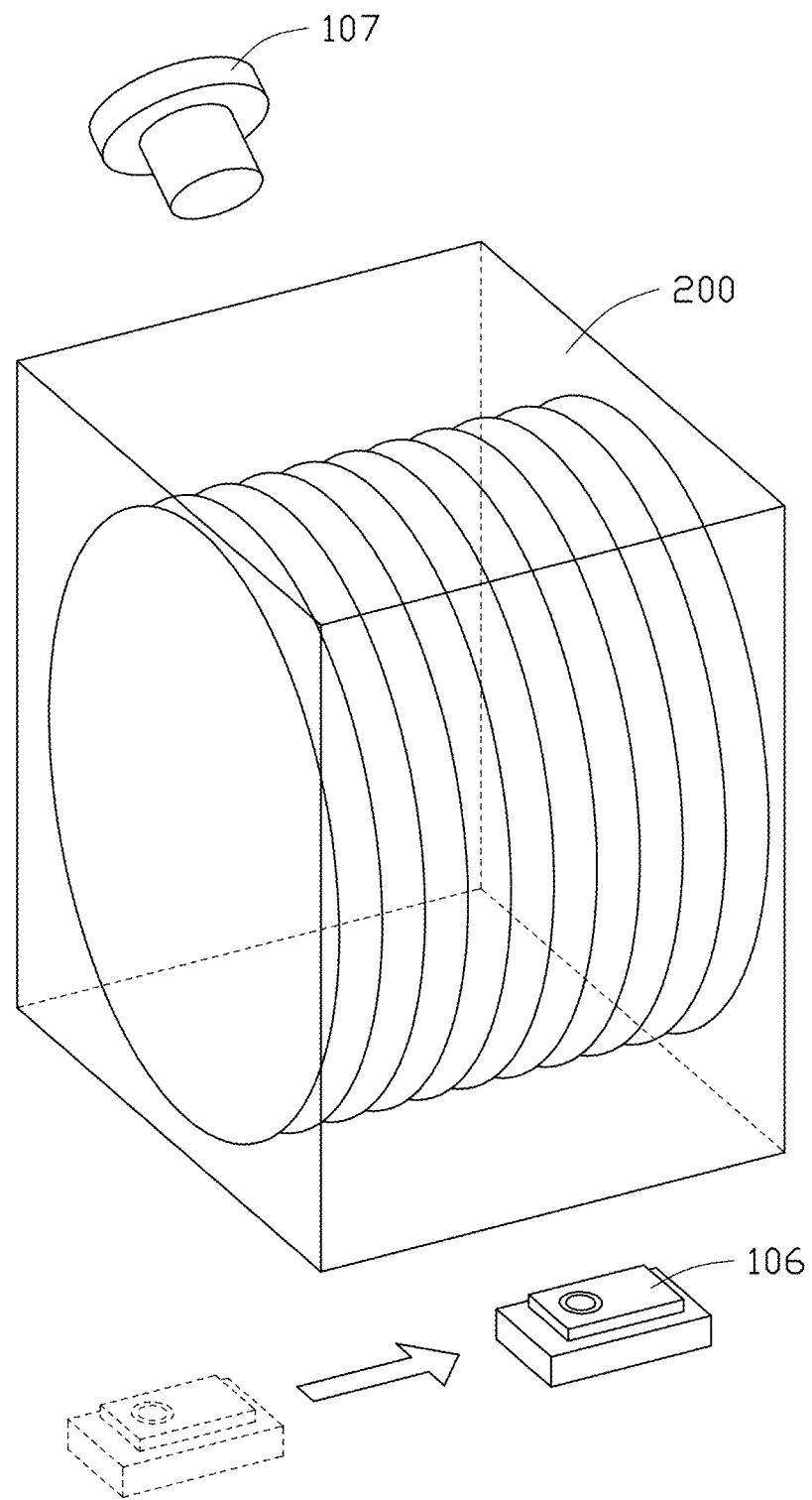
FIG. 7 illustrates a process of acquiring an image of a container.

Referring to FIG. 7, the method may move the camera 106 to obtain the image of the sub-area.

In FIG. 7, the camera 106 is arranged under the wafer carrier and the camera 106 moves from left to right. The moving direction of the camera 106 and the placement position of the target object 201 are not specifically limited. The movement of the camera 106 is to obtain the image of the sub-area.

Figure 8:
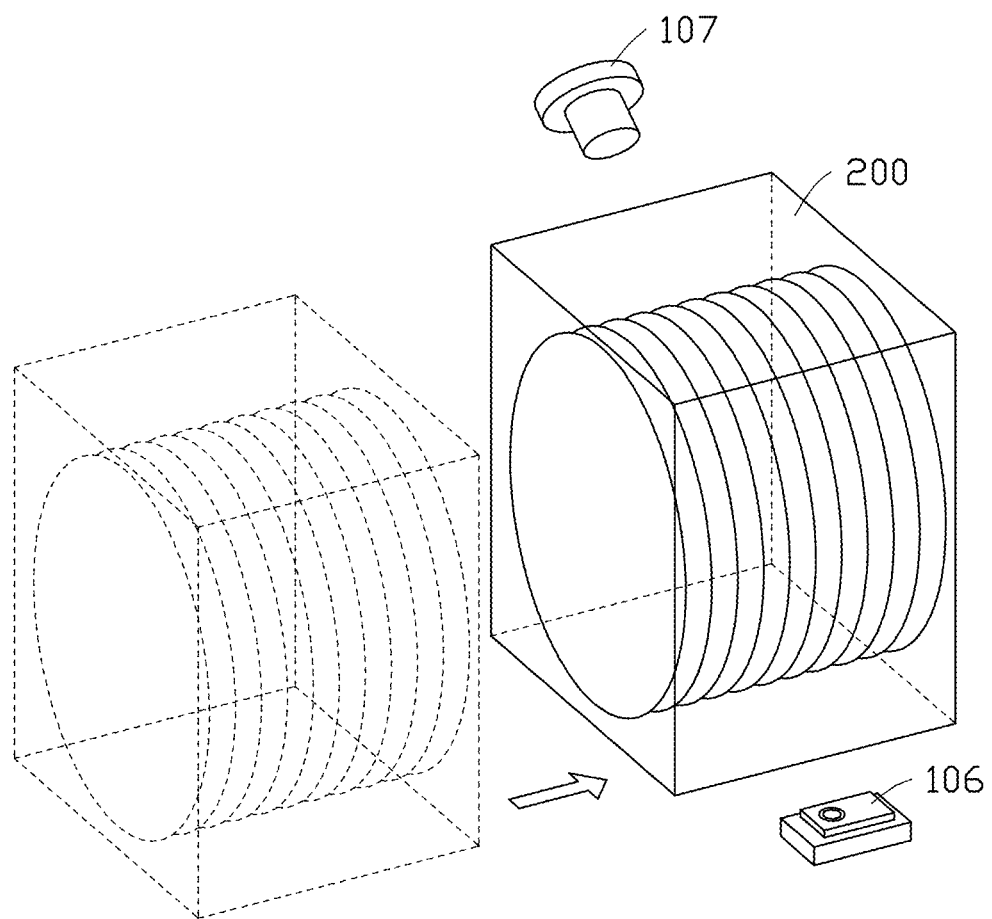
FIG. 8 illustrates another process of acquiring an image of a container.

Referring to FIG. 8, the container 200 can be moved so that the sub-area of the container 200 passes through the camera 106, to obtain the image of the sub-area.

In FIG. 8, the camera 106 is arranged under the wafer carrier. The wafer carrier moves from left to right and passes under the camera 106. The moving direction of the wafer carrier is not specifically limited.

In the embodiment, each sub-area is provided with a camera 106 for capturing it, and each sub-area corresponds to a camera 106 to obtain the image taken by the camera 106 corresponding to the sub-area.

In the embodiment, please refer to FIGS. 7 and 8 together, the wafer carrier is set between the camera 106 and a light source 107, the camera 106 is set in a direction that can recognize the placement state of the target object 201 in the container 200. The lens of the camera 106 is facing the area where the placement state of the target object 201 in the container 200 can be recognized, and the light source 107 provides light source illumination in the direction of the lens of the camera 106.

In block 44, inputting the images into the artificial intelligence model, and obtaining the states of placement of the target objects in the sub-areas.

Figure 9:
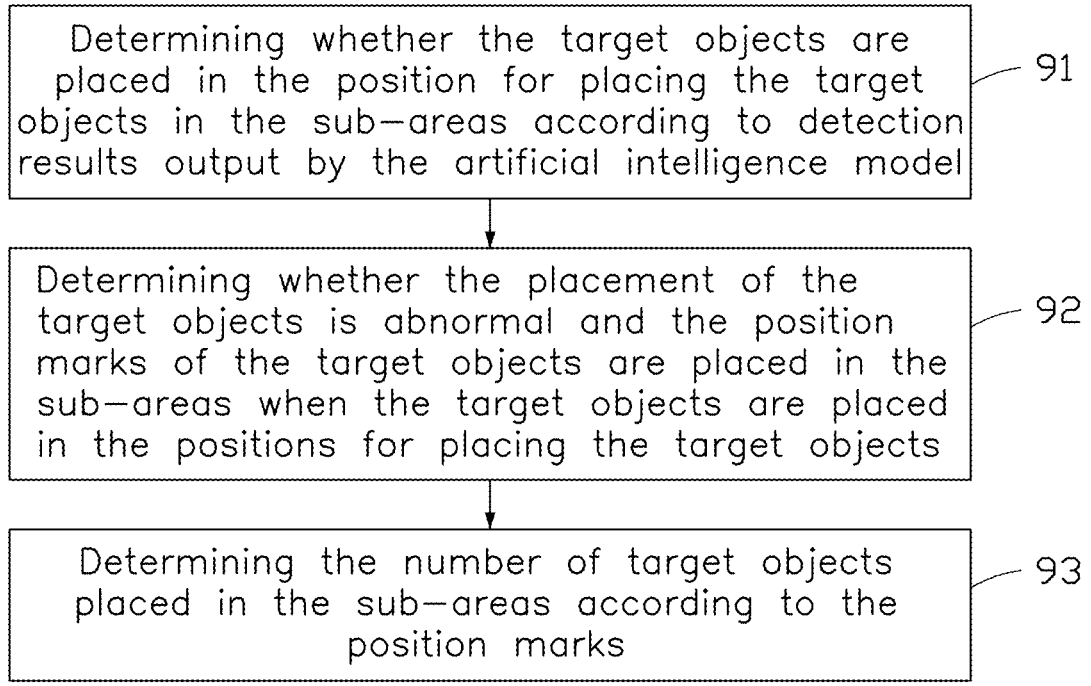
FIG. 9 is a flowchart of another embodiment of an object detecting method according to the present disclosure.

Referring to FIG. 9, the inputting the images into the artificial intelligence model, and obtaining the states of placement of the target object in the sub-area can be achieved by the following steps:

In block 91, determining whether the target objects are placed in the position for placing the target objects in the sub-areas according to detection results output by the artificial intelligence model.

In block 92, determining whether the placement of the target objects is abnormal and the position marks of the target objects are placed in the sub-areas when the target objects are placed in the positions for placing the target objects.

In block 93, determining the number of target objects placed in the sub-areas according to the position marks.

Figure 10:
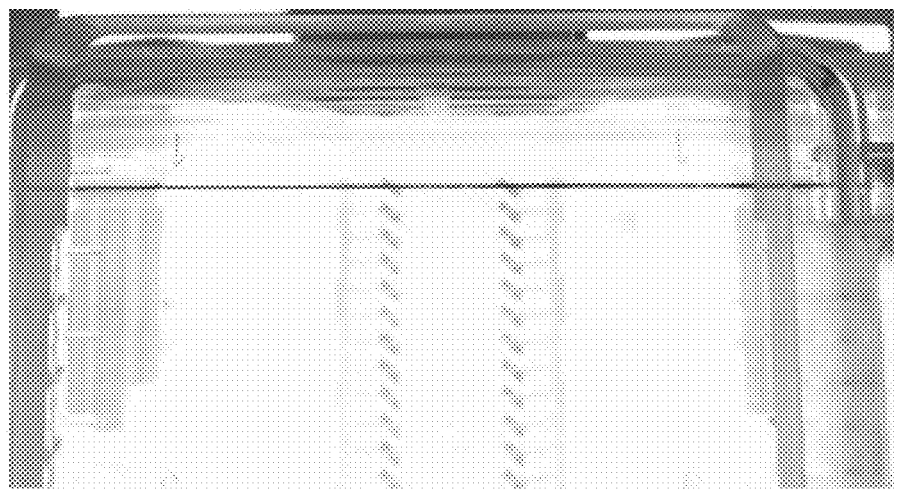
FIG. 10 illustrates an image of normal placement of a wafer.
Figure 11:
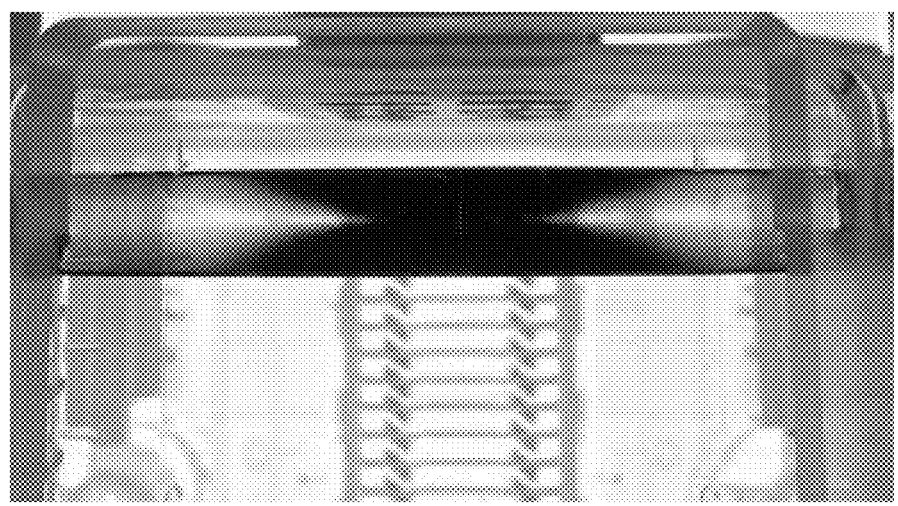
FIG. 11 illustrates an image showing a wafer delamination.
Figure 12:
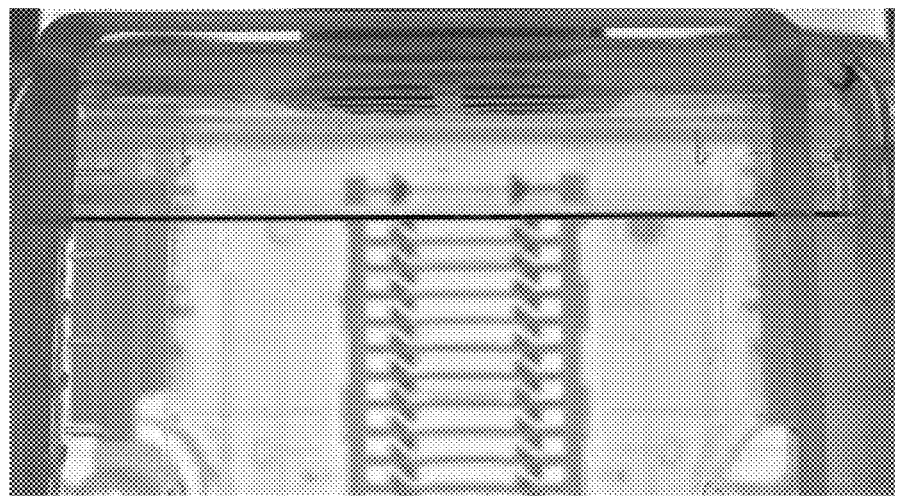
FIG. 12 illustrates an image of a wafer in diagonal placement.
Figure 13:
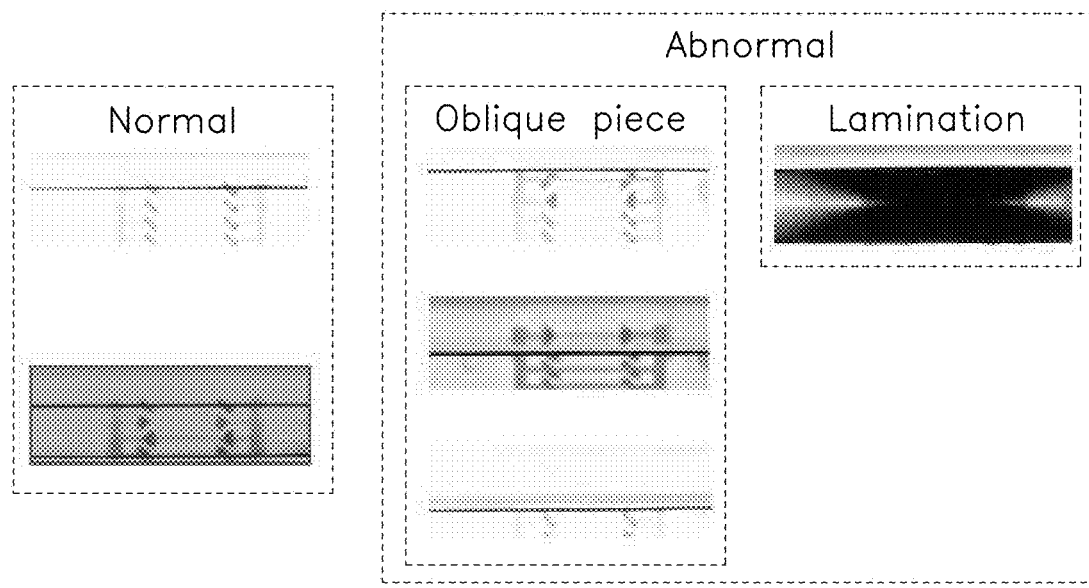
FIG. 13 shows an embodiment of results of image processing.

In the embodiment, take the wafer carrier as an example, and place the camera 106 directly under the wafer. When the wafer is placed normally, as shown in FIG. 10, it can see the image when the wafer is placed normally. As shown in FIG. 11, when the wafers are stacked, the image does not match the normal feature condition or there is a condition that cannot transmit light. As shown in FIG. 12, when the wafer is tilted, the image does not match the normal feature condition or there is a condition that cannot transmit light. When the wafer is broken, the image does not match the normal feature condition or there is a condition that cannot transmit light. When the wafer is placed, it can take the image of the wafer. When there is no wafer here, the image can only be seen inside the wafer carrier. When the camera 106 or the wafer carrier is moving, the wafer image in the wafer carrier can be obtained from the direction in which the characteristics of the wafer can be identified to obtain the information of the number and position of the wafer. The artificial intelligence model will perform image processing on the captured images, as shown in FIG. 13, output the feature recognition results, and get the wafer placement status.

In the embodiment, the position for placing the target object 201 in each sub-area identifies its corresponding position mark. When it is detected that the target object 201 is placed in a certain position, the placement position of the target object 201 is determined according to the position mark corresponding to the position. Then the number of the target object 201 in the sub-area to be measured can be counted according to the position mark corresponding to the position where the target object 201 is placed. The placement state, position, and quantity of the target object 201 in the container 200 can also be determined according to the detection results of each sub-area in the container 200.

The present disclosure also provides a storage medium. The storage medium can be a computer readable storage medium.

The computer instructions are stored in the storage 102 and are implemented by the processor 106 to achieve a method for detecting target objects as recited in blocks 11-16 of FIG. 5.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for detecting target objects in a container, the method comprising:
    dividing an area where states of placement of the target objects in the container, to generate N number of sub-areas; wherein N being a positive integer;
    obtaining an artificial intelligence model; wherein the artificial intelligence model is a model obtained by training according to a training images, and the training images are images of the sub-areas;
    obtaining images taken by a camera corresponding to the sub-area; wherein each sub-area is provided with one camera;
    inputting the images into the artificial intelligence model, and obtaining the states of placement of the target objects in the sub-areas;
    wherein the dividing an area where states of placement of the target objects in the container, to generate N number of sub-areas comprises:
    determining an area where the states of placement of the target objects in the container is recognized according to positions where the target objects are placed in the container; and
    dividing the area to generate the N number of sub-areas; wherein the sub-areas comprise the area where the target objects are placed;
    wherein the training images comprises an image of the target object is placed, an image where the target object is not placed, a pre-stored image when the target object is correctly placed, and a pre-stored image when the target object is incorrectly placed.

2. The method according to claim 1, further comprising:

determining whether the target objects are placed in the positions for placing the target objects in the sub-areas according to detection results output by the artificial intelligence model;

determining whether the placement of the target objects are abnormal and position marks of the target objects are placed in the sub-areas when the target objects are placed in the positions for placing the target objects;

determining a number of the target objects placed in the sub-area according to the position marks.

3. An electronic device comprising:

a storage; and a processor;

wherein the storage stores one or more programs, which when executed by the processor, cause the processor to:

determine an area where states of placement of the target objects in the container is recognized according to positions where the target objects are placed in the container; and divide the area to generate N number of sub-areas; wherein the sub-areas comprise the area where the target objects are placed; wherein N being a positive integer;

obtain an artificial intelligence model; wherein the artificial intelligence model is a model obtained by training according to a training images, and the training images are images of the sub-areas;

obtain images taken by a camera corresponding to the sub-area; wherein each sub-area is provided with one camera;

input the images into the artificial intelligence model, and obtain the states of placement of the target objects in the sub-areas;

wherein the training images comprise an image of the target object is placed, an image where the target object is not placed, a pre-stored image when the target object is correctly placed, and a pre-stored image when the target object is incorrectly placed.

4. The electronic device according to claim 3, wherein the processor is further caused to:

determine whether the target objects are placed in the position for placing the target objects in the sub-area according to detection results output by the artificial intelligence model;

determine whether the placement of the target objects is incorrectly placed, and if the placement of the target objects is determined to be incorrectly placed, mark positions of the target objects are placed in the sub-areas;

determine a number of the target objects placed in the sub-area according to the positions which are marked.

5. A non-transitory storage medium having stored thereon instructions that, when executed by a processor of an electronic device, causes the processor to perform a performance tuning method, the method comprising:

dividing an area where states of placement of the target objects in the container, to generate N number of sub-areas; wherein N being a positive integer;

obtaining an artificial intelligence model; wherein the artificial intelligence model is a model obtained by training according to a training images, and the training images are images of the sub-areas;

obtaining images taken by a camera corresponding to the sub-area; wherein each sub-area is provided with one camera;

inputting the images into the artificial intelligence model, and obtaining the states of placement of the target objects in the sub-areas;

wherein the dividing an area where states of placement of the target objects in the container, to generate N number of sub-areas comprises:

determining an area where the states of placement of the target objects in the container is recognized according to positions where the target objects are placed in the container; and dividing the area to generate the N number of sub-areas; wherein the sub-areas comprise the area where the target objects are placed.

6. The non-transitory storage medium according to claim 5, further comprising:

moving a camera to obtain the images of the sub-areas.

7. The non-transitory storage medium according to claim 5, further comprising:

moving the container so that images of the sub-areas of the container can be captured by a camera, thereby obtaining the images of the sub-areas.

* * * * *